(12) United States Patent
Albers et al.

(10) Patent No.: US 6,612,799 B1
(45) Date of Patent: Sep. 2, 2003

(54) CART LOADING SYSTEM

(75) Inventors: Brent Albers, Sioux Falls, SD (US); Lloyd L. Reaves, Sioux Falls, SD (US)

(73) Assignee: Component Manufacturing Company, Sioux Falls, SD (US)

( * ) Notice: Subject to any disclaimer, the term of this patent is extended or adjusted under 35 U.S.C. 154(b) by 0 days.

(21) Appl. No.: 09/976,733

(22) Filed: Oct. 12, 2001

(51) Int. Cl.$^7$ ............................................... B65G 57/00
(52) U.S. Cl. .................. 414/398; 414/791.5; 414/794.4; 414/900; 414/902; 414/923
(58) Field of Search ......................... 414/331.13, 398, 414/401, 584, 791.5, 794.4, 900, 902, 923

(56) References Cited

U.S. PATENT DOCUMENTS

| | | | |
|---|---|---|---|
| 2,658,630 A | * 11/1953 | Melin | 414/791.6 |
| 4,234,282 A | * 11/1980 | Lewallyn | 414/790 |
| 5,034,877 A | 7/1991 | Shultz | |
| 5,164,896 A | 11/1992 | Nagayasu | |
| 5,203,671 A | * 4/1993 | Cawley et al. | 414/791.6 |
| 5,413,455 A | * 5/1995 | Rohde et al. | 414/793.2 |
| 5,459,384 A | 10/1995 | Engelse et al. | |
| 5,590,046 A | 12/1996 | Anderson et al. | |
| 5,653,574 A | * 8/1997 | Lin | 414/791.5 |
| 5,900,708 A | 5/1999 | Den Engelse et al. | |
| 5,988,849 A | 11/1999 | Engelhardt | |
| 6,203,262 B1 | * 3/2001 | Frich et al. | 414/331.01 |
| 6,312,208 B1 | * 11/2001 | Crowley et al. | 414/398 |

FOREIGN PATENT DOCUMENTS

DE 3336067 * 4/1985 ................. 414/923

* cited by examiner

*Primary Examiner*—James W. Keenan
(74) *Attorney, Agent, or Firm*—Kaardal & Leonard, LLP

(57) ABSTRACT

A cart loading system for loading materials on a cart in a orderly and compact manner even if the materials being loaded have different dimensions. The cart loading system includes a frame for positioning on a floor surface adjacent to a material shaping table, and at least one material support arm assembly for moving a piece of material from the material shaping table to a position over the frame. A carriage assembly is provided for moving a material cart in a first direction and a second direction with respect to the frame, and includes a subframe movable in the second direction on the frame and a shuttle mounted movable in the first direction with respect to the subframe. A first moving assembly is provided for moving the shuttle in the first direction on the subframe, and a second moving assembly is provided for moving the carriage assembly in the second direction on the frame. A detection assembly detects movement of material on the support arm assembly and generates a detection signal. A control assembly controls movement of the shuttle with respect to the frame, and moves the shuttle a predetermined distance in the second direction based upon dimensions of the material determined from the detection signal.

13 Claims, 11 Drawing Sheets

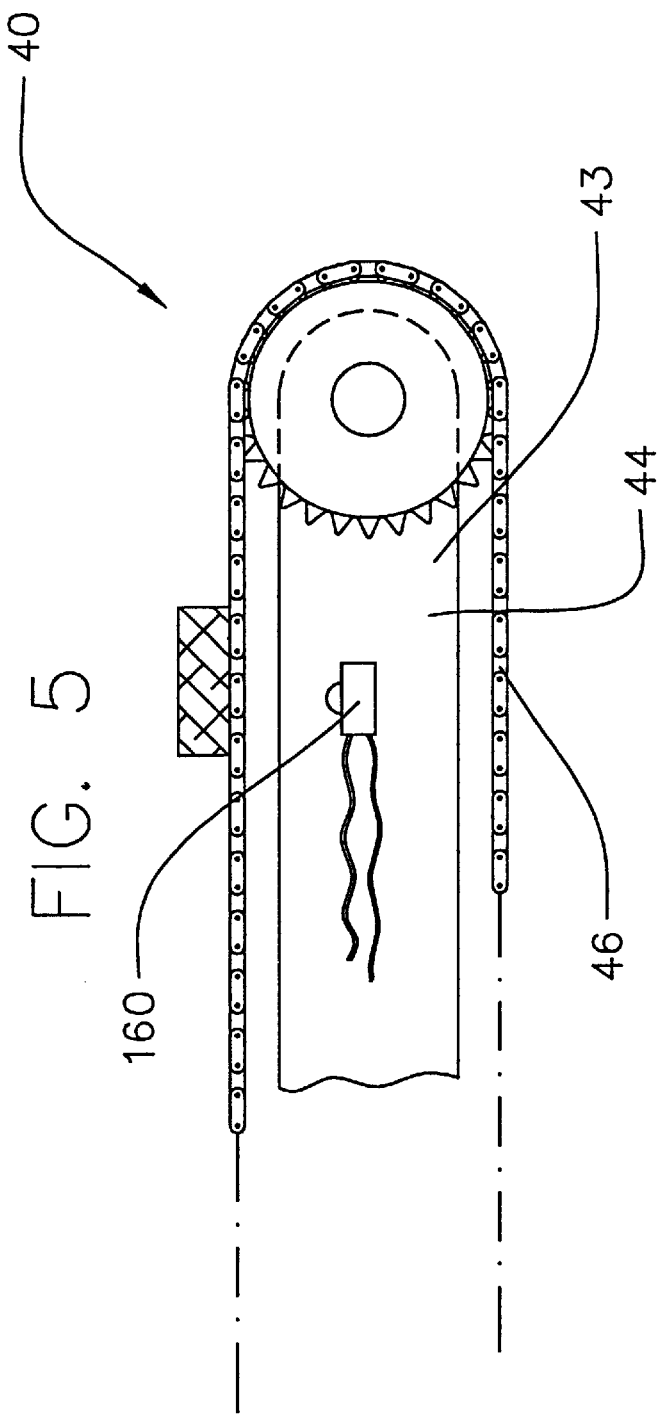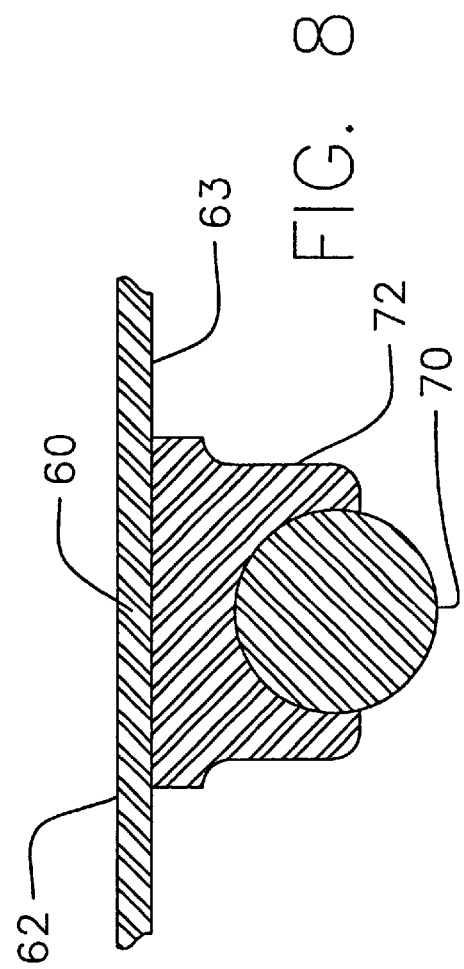

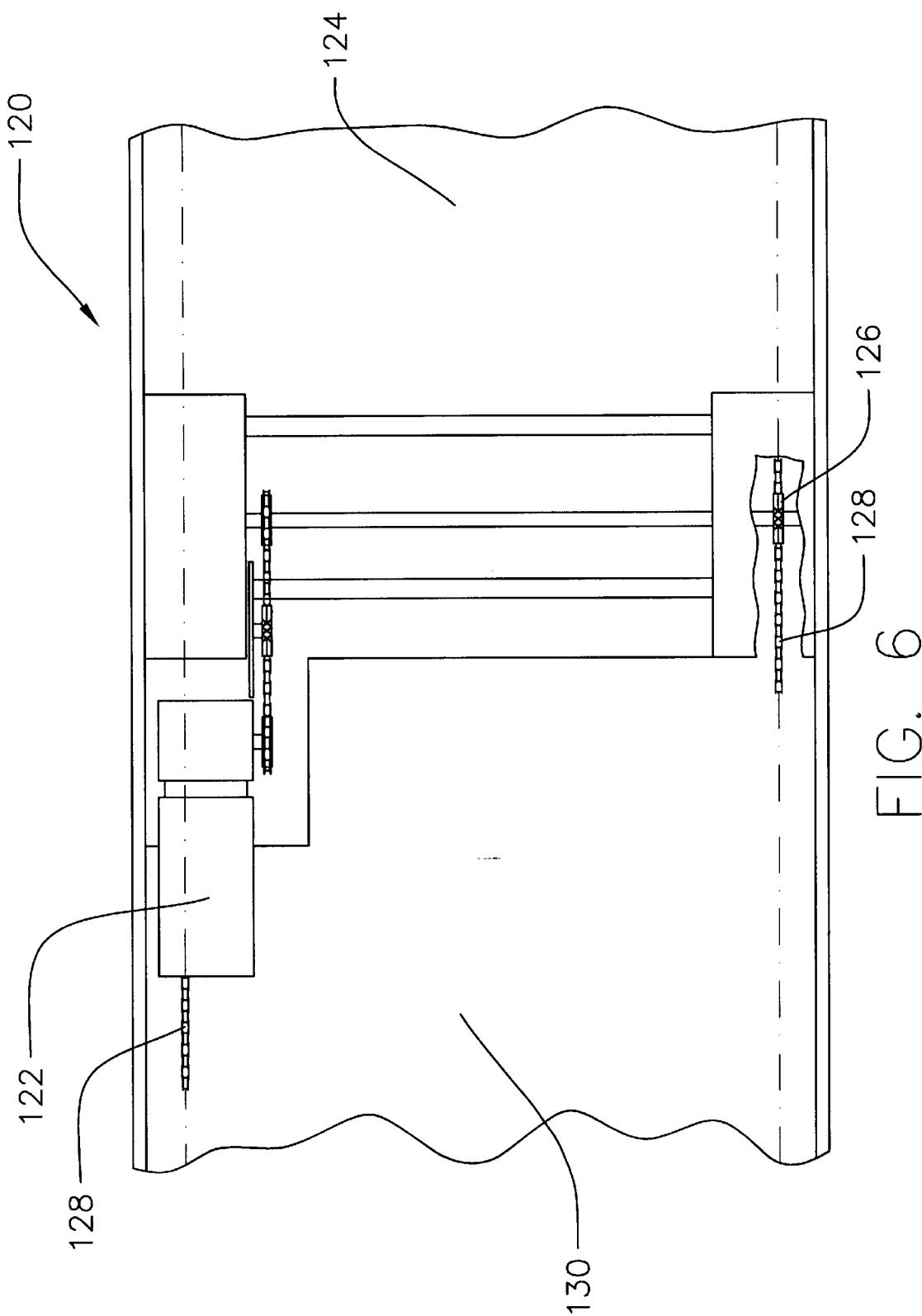

CART LOADING SYSTEM

BACKGROUND OF THE INVENTION

1. Field of the Invention

The present invention relates to automated loading systems and more particularly pertains to a new cart loading system for loading materials on a cart in an orderly and compact manner even if the materials being loaded have different dimensions.

2. Description of the Prior Art

Roof trusses may be formed in many different sizes and shapes, and it is becoming increasingly rare that a structure such as a custom built home employs only one, uniform size and shape for every truss used on the house. This has called for flexibility in the manner in which the trusses are built, as each truss that is built may not be the same as the preceding or succeeding trusses.

Within truss fabricating facilities, carts are often employed for moving the truss fabricating material from the location at which the material is cut or other wise shaped into the appropriate size and shape, to the location where the truss is assembled. Typically, the materials for a truss are loaded onto a cart for delivery to the fabrication station. The materials for a single truss will vary not only in length, but often vary in the dimension (width and thickness). Commonly, but not exclusively, boards of two inch (nominal) thickness may be used for all parts of the truss, but the widths of the boards may vary from three inches to twelve or more inches.

Loading of carts is typically handled by a person who physically picks the board from the saw table and places the board in the hopper of the cart. This is, of course, labor intensive but the need to adjust to different board dimensions and board lengths requires quick adaptivity in loading the cart, so that the boards are not just randomly dropped in the hopper with widths oriented in different directions and so that some boards are stacked on a side while other boards are stacked on a face. Such random orientation of the boards in the cart makes the unloading operation more difficult and more time consuming, as the boards need to be moved to jigs where one of the faces is directed downwardly and the sides of the board are substantially vertical. The random orientation of the boards is typically less space efficient. It is avoiding the stacking of the boards in this last mentioned random manner that has posed the most vexing problem in trying to reduce or even eliminate the need for a human to physically load the cart.

In these respects, the cart loading system according to the present invention substantially departs from the conventional concepts and designs of the prior art, and in so doing provides an apparatus primarily developed for the purpose of loading materials on a cart in an orderly and compact manner even if the materials being loaded have different dimensions.

SUMMARY OF THE INVENTION

In view of the foregoing disadvantages inherent in the known types of now present in the prior art, the present invention provides a new cart loading system construction wherein the same can be utilized for loading materials on a cart in a orderly and compact manner even if the materials being loaded have different dimensions.

The present invention generally comprises a frame for positioning on a floor surface adjacent to a material shaping table, and at least one material support arm assembly for moving a piece of material from the material shaping table to a position over the frame. A carriage assembly is provided for moving a material cart in a first direction and a second direction with respect to the frame, and includes a subframe movable in the second direction on the frame and a shuttle mounted movable in the first direction with respect to the subframe. A first moving assembly is provided for moving the shuttle in the first direction on the subframe, and a second moving assembly is provided for moving the carriage assembly in the second direction on the frame. A detection assembly detects movement of material on the support arm assembly and generates a detection signal. A control assembly controls movement of the shuttle with respect to the frame, and moves the shuttle a predetermined distance in the second direction based upon dimensions of the material determined from the detection signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic side view of support arm assembly of the present invention.

FIG. 6 is a schematic top view of an optional first moving assembly of the present invention particularly illustrating a track and stop member.

FIG. 8 is a schematic sectional view of a ball and socket of the rollers of the present invention.

DESCRIPTION OF THE PREFERRED EMBODIMENT

Figure 1:
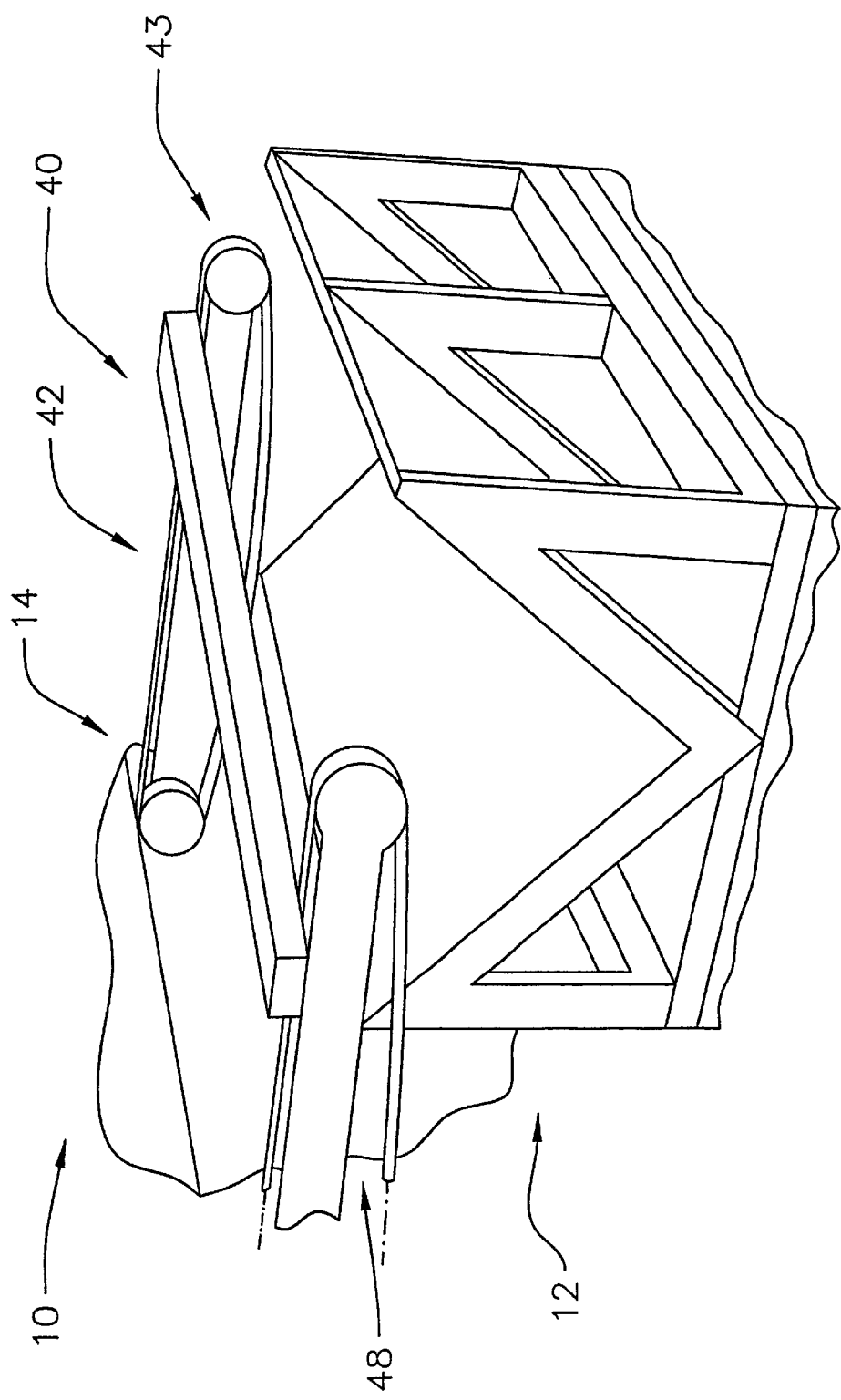
FIG. 1 is a schematic perspective view of a portion of a new cart loading system according to the present invention.
Figure 2:
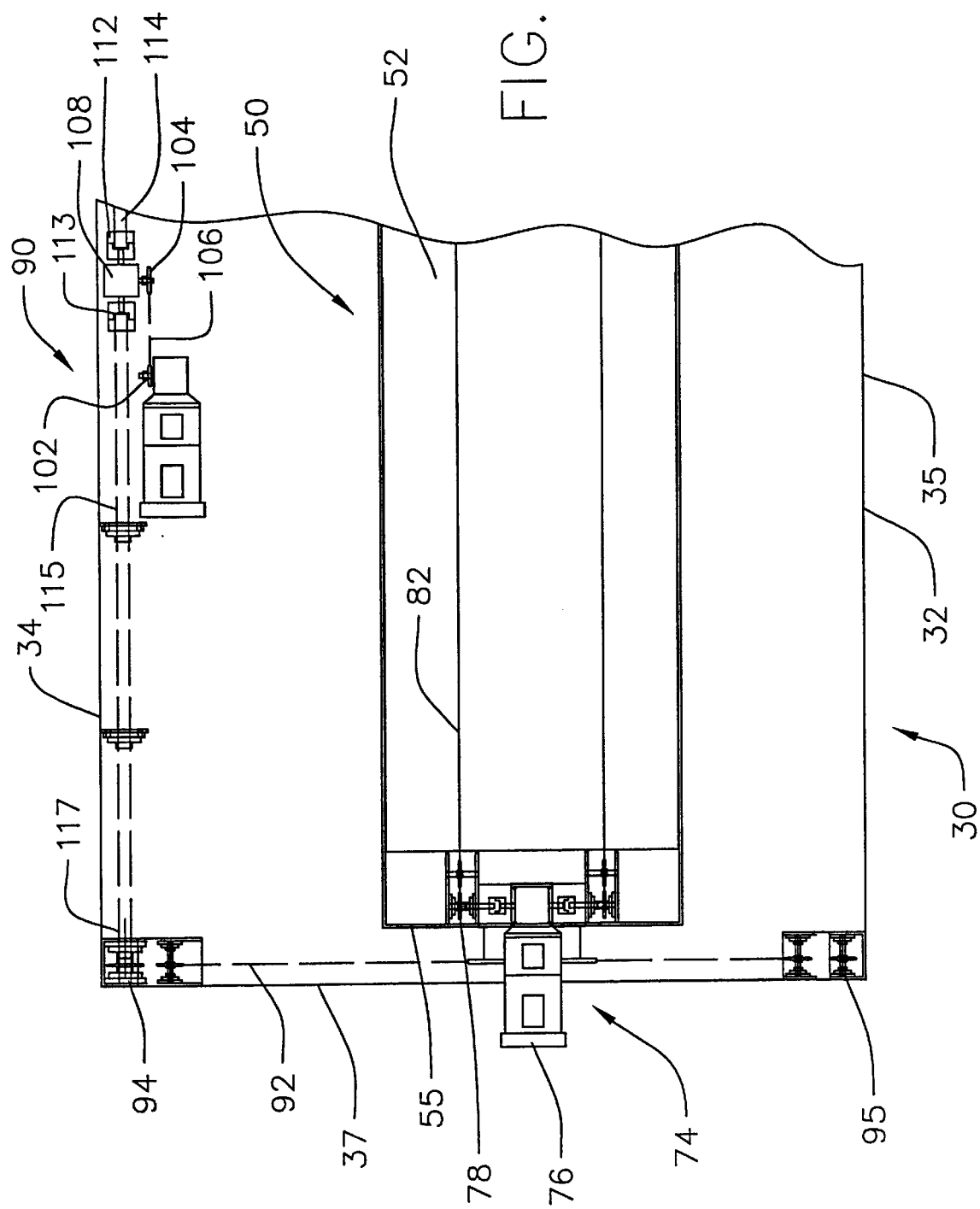
FIG. 2 is a schematic top view of a first portion of the frame and subframe of the present invention.
Figure 3:
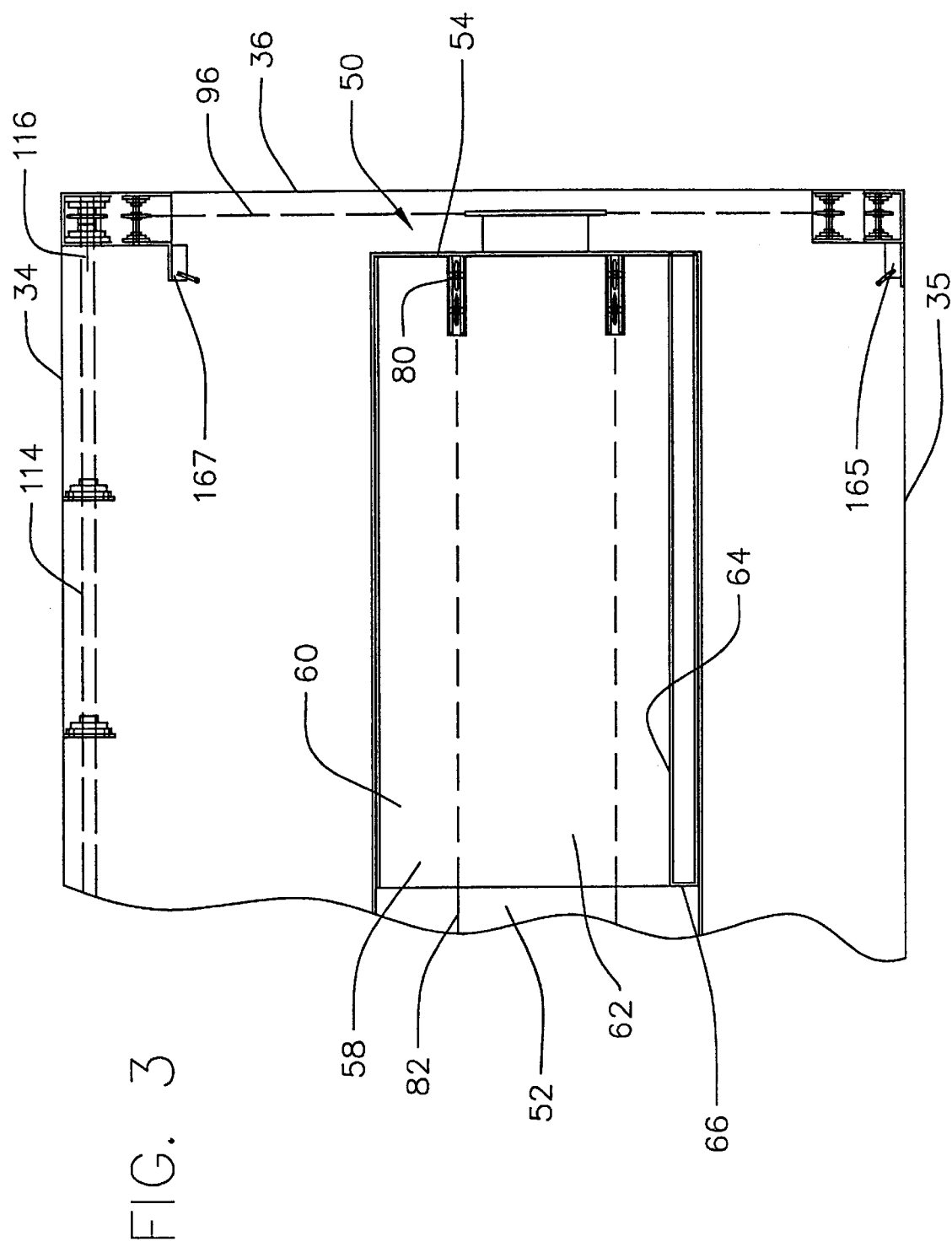
FIG. 3 is a schematic top view of a second portion of the frame and subframe of the present invention and particularly illustrates the shuttle on the subframe.
Figure 4:
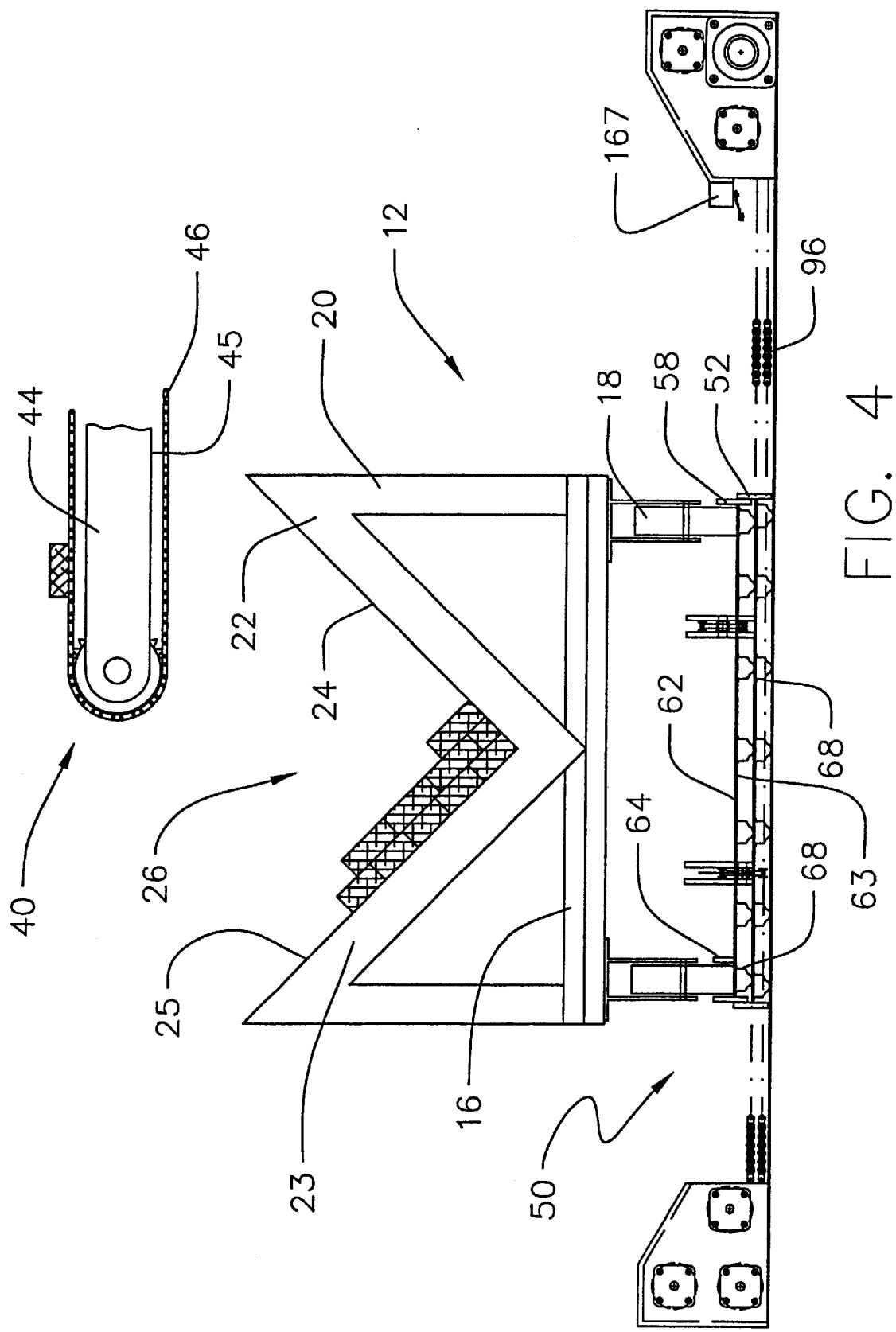
FIG. 4 is a schematic end view of the present invention particularly illustrating a cart positioned on the shuttle and subframe.
Figure 7:
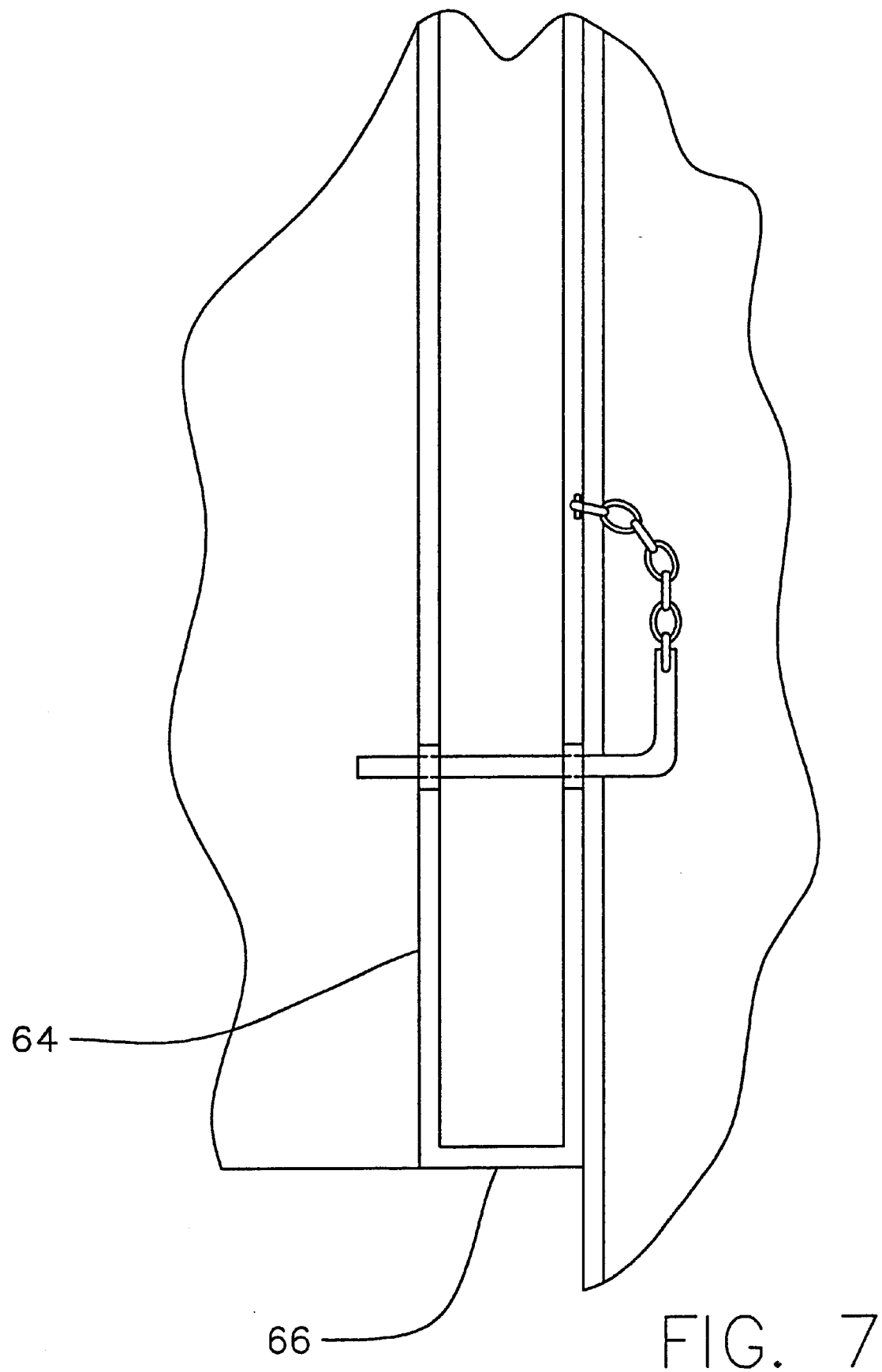
FIG. 7 is a schematic top view of a portion of the shuttle of the present invention.

With reference now to the drawings, and in particular to FIGS. 1 through 12 thereof, a new cart loading system embodying the principles and concepts of the present invention and generally designated by the reference numeral 10 will be described.

The invention comprises a cart loading system 10 for loading materials on a cart 12, and is most suitably employed for moving materials from a material shaping table 14 for shaping pieces of material. Illustratively, the material shaping table may be a cutting or sawing table, and the materials may comprise dimension lumber such as two-by-three inch boards, two-by-four inch boards, two-by-six inch boards, two-by-eight inch boards, two-by-ten inch boards, and two-by-twelve inch boards that are cut to various lengths for forming structures, such as, for example, prefabricated truss components used for supporting roof decks on buildings.

One cart for transporting materials that is highly suitable for use with the cart loading system has a base frame 16, and a plurality of wheels 18 mounted on the bottom of the base frame. Each of the wheels may be mounted adjacent to a corner of the base frame, and may be oriented for rotation about substantially parallel axes. A support frame 20 may be mounted on a top of the base frame. The support frame may have a first side portion 22 and a second side portion 23, and the first side portion may define a first support surface 24 and the second side portion may define a second support surface 25. The first and second support surfaces may lie in planes that form a substantially V-shaped channel 26. The planes of the first and second support surfaces may each be oriented at a sloped orientation with respect to the horizontal, such as, for example, at an angle of approximately 45 degrees with respect to a horizontal plane. Illustratively, the first and second support surfaces may be oriented substantially perpendicular to each other.

The cart loading system includes a frame 30 for positioning on a floor surface adjacent to the material shaping table. The frame has a perimeter 32, which may be generally rectangular, formed by a pair of first sides 34, 35 and a pair of second sides 36, 37. The pair of first sides generally extend in a first direction, and the second sides generally extend in a second direction. The first direction of the first sides may be oriented substantially perpendicular to the second direction. A first one 34 of the first sides is suitably positionable toward and generally adjacent to the material shaping table.

The cart loading system of the invention may also include at least one material support arm assembly 40 for moving a piece of material from the material shaping table to a position over the frame 30. At least a portion of the material support arm assembly should extend over the frame when installed. For example, when the first one 34 of the first sides is positioned adjacent to the material shaping table, the material support arm assembly will extend over the first one 34 of the first sides. The material support arm assembly has a first end 42 for mounting on the material shaping table and a second end 43 for positioning above the frame 30. The material support arm assembly 40 may include a bar member 44 having a perimeter 45 and an elongate flexible member 46 that generally extends along the bar member. Illustratively, the elongate flexible member comprises a chain that is entrained on a sprocket mounted on the second end of the bar member. The chain may thus have an upper stretch that moves away from the table, and a lower stretch that moves toward the table. The chain is preferably adapted for moving a piece of material along bar member as the chain moves along the bar member. Illustratively, the chain may have a plurality of teeth mounted thereon for engaging a piece of material placed on the chain to move the material with the chain. Preferably, the teeth are positioned on the chain at substantially uniform spacings between the teeth.

Preferably, a pair 40, 48 of material support arm assemblies are included in the cart loading system of the invention for supporting spaced locations of an elongate piece of material such as a board. The support arm assemblies 40, 48 may be oriented substantially parallel with respect to each other, and the arm assemblies may be laterally spaced from each other. The travel rates of the chains on the material support arm assemblies are suitably adapted to move along the bar members at substantially the same pace so that a board moving on the assemblies does not change orientation with respect to the assemblies as the piece of material moves along the assemblies, and thus so an orientation of the board that is substantially perpendicular to the bar members of the assemblies may be maintained as the piece travels from the first end of the bar member towards the second end of the bar member.

The cart loading system of the invention also includes a carriage assembly 50 adapted for moving the cart 12 in the first direction and the second direction with respect to the frame for positioning the cart with respect to the support arm assemblies so that pieces of material are positioned on the cart in an orderly manner. The carriage assembly is movably mounted on the frame.

The carriage assembly may include a subframe 52 mounted on the frame 30 in a manner that permits movement of the subframe in the second direction with respect to the frame. The subframe has a first end 54 and a second end 55 that are each movably mounted on one of the second sides of the frame such that the subframe extends between the second sides of the frame.

A shuttle 58 is mounted on the subframe in a manner permitting movement of the shuttle in the first direction with respect to the subframe. The shuttle 58 is thus movable between the first and second ends of the subframe. The shuttle may have a bed 60 that has a top 62 for supporting the material cart 12, and also has a bottom 63. At least one track 64 may be formed on the top 62 of the bed for receiving at least one of the wheels 18 of the material cart, and optionally at least one track 64 may be included on the shuttle. A stop 66 may be formed or mounted on at least one of the tracks for blocking movement of the material cart off of the bed in one direction while still permitting movement of the cart in the opposite direction. A pin (see FIG. 7) may be removably mounted on the tracks for selectively trapping a wheel on the cart between the pin and the stop.

A plurality of rollers 68 may be provided for facilitating movement of the shuttle on the subframe. Each roller 68 is mounted on the bottom 63 of the bed for facilitating movement of the shuttle on the subframe. Each of the rollers 68 may comprise a substantially spherical ball 70 mounted in a socket 72, with the socket being mounted on the bottom of the bed and opening downwardly, with the ball being positioned generally below the socket. The rollers are also preferable mounted on a lower surface of the subframe for facilitating movement of the subframe on the frame.

A first moving assembly 74 may be provided for moving the shuttle 58 on the subframe in the first direction and along a path oriented substantially parallel to the first sides of the frame. The first moving assembly functions to position the shuttle in a location where material falling from the material support arms lands the cart in a substantially longitudinally-centered position on the cart. This positioning of the first moving assembly may be best accomplished by centering the cart at a location generally midway between the material supper arms. In the illustrative embodiment of the invention, the first moving assembly is manually actuatable by the operator, such as, for example, by manually turning the supply of power to the first moving assembly one and off.

The first moving assembly may include a first motor 76 that is mounted on the subframe 52. The first motor may be mounted adjacent to one of the ends 54, 55 of the subframe. A drive sprocket 78 may be mounted on the first motor. A driven sprocket 80 may be rotatably mounted on the shuttle 58. A chain 82 extends about the drive 78 and driven 80 sprockets. A portion of the chain 82 may be fixedly mounted on the shuttle such that rotation of the drive sprocket by the first motor in a first rotational direction moves the shuttle toward a first one of the ends of the subframe, and rotation of the drive sprocket by the first motor in a second rotational direction moves the shuttle toward a second one of the ends of the subframe.

A second moving assembly 90 may be provided for moving the carriage assembly 50 in the second direction with respect to the frame 30. The second actuating assembly may include an elongate flexible member 92 that extends along one of the second sides of the frame. The elongate flexible member 92 has a portion that is mounted on the subframe such that movement of the elongate flexible member moves the subframe 52 in the second direction with respect to the frame. The elongate flexible member may comprise a chain loop that is mounted on spaced sprockets 94, 95. Each of the spaced sprockets is located adjacent to one of the first sides of the frame. A pair 96, 97 of the chain loops may be provided, with each of the chain loops being positioned adjacent to one of the second sides of the frame such that the chain loops are oriented in a spaced, substantially parallel relationship. Each of the chain loops is mounted on the spaced sprockets adjacent to one of the ends of the subframe.

The second moving assembly may also include a second motor 100 that is mounted on the frame. The second motor is positioned adjacent to the first one 34 of the first sides of the frame. The second motor has a rotational axis that may be oriented substantially parallel to the first sides 34, 35.

The invention may also include transferring means for transferring rotational motion from the second motor to the chain loops. The transferring means may include a driver pulley 102 that is mounted on the second motor 100 and that is rotated by the second motor. The transferring means may also comprise a transfer assembly that includes a driven pulley 104, a loop member 106 rotationally connecting the driver pulley and the driven pulley, and a transfer gear case 108 having an input member mounted for rotation with the driven pulley. A pair of opposite output members 112, 113 may be mounted on the transfer gear case 108, and a plurality of gears (not shown) may be provided in the transfer gear case for connecting the input member to the output members.

A pair of transfer shafts 114, 115 may be rotationally mounted on the frame. Each of the transfer shafts 114, 115 are connected to one of the output members 112, 113 of the transfer assembly. The transfer shafts may be positioned adjacent to the first one of the first sides. The transfer shafts extend substantially parallel to the first sides 34, 35 of the frame. The transfer shafts 114, 115 have a pair of opposite ends 116, 117. Each of the opposite ends may be positioned substantially adjacent to one of the second sides 34, 35 of the frame. Each of the spaced sprockets 94, 95 is mounted on one of the transfer shafts.

In an optional and less preferred embodiment of the invention, a first moving assembly 120 comprises a first motor 122 mounted for movement with the shuttle 124, and, in this embodiment of the invention, is mounted on the shuttle. A drive sprocket 126 is mounted on the shuttle, and is driven by the first motor in a suitable manner such as through an endless chain. The drive sprocket has a plurality of teeth. Significantly, a chain 128 is mounted on the subframe 130 in a manner that does not permit movement of the chain with respect to the subframe. The chain may extend longitudinally between the ends [132, 133] of the subframe, and preferably the chain is not of the endless loop type but has discrete ends located adjacent the ends [132, 133] of the subframe. The chain 128 is exposed, preferably in an upward direction that permits a portion of the plurality of teeth of a sprocket that is rotationally coupled to the drive sprocket to engage a portion of the chain along the path of the shuttle on the subframe. As a result, rotation of the drive sprocket by the first motor in a first rotational direction moves the shuttle toward a first one of the ends of the subframe and rotation of the drive sprocket by the first motor in a second rotational direction moves the shuttle toward a second one of the ends of the subframe. In the illustrative embodiment of the invention, a pair of the chains is mounted on the subframe, and a corresponding pair of sprockets is mounted on a common axle on the shuttle for engaging the pair of chains.

Figure 12:
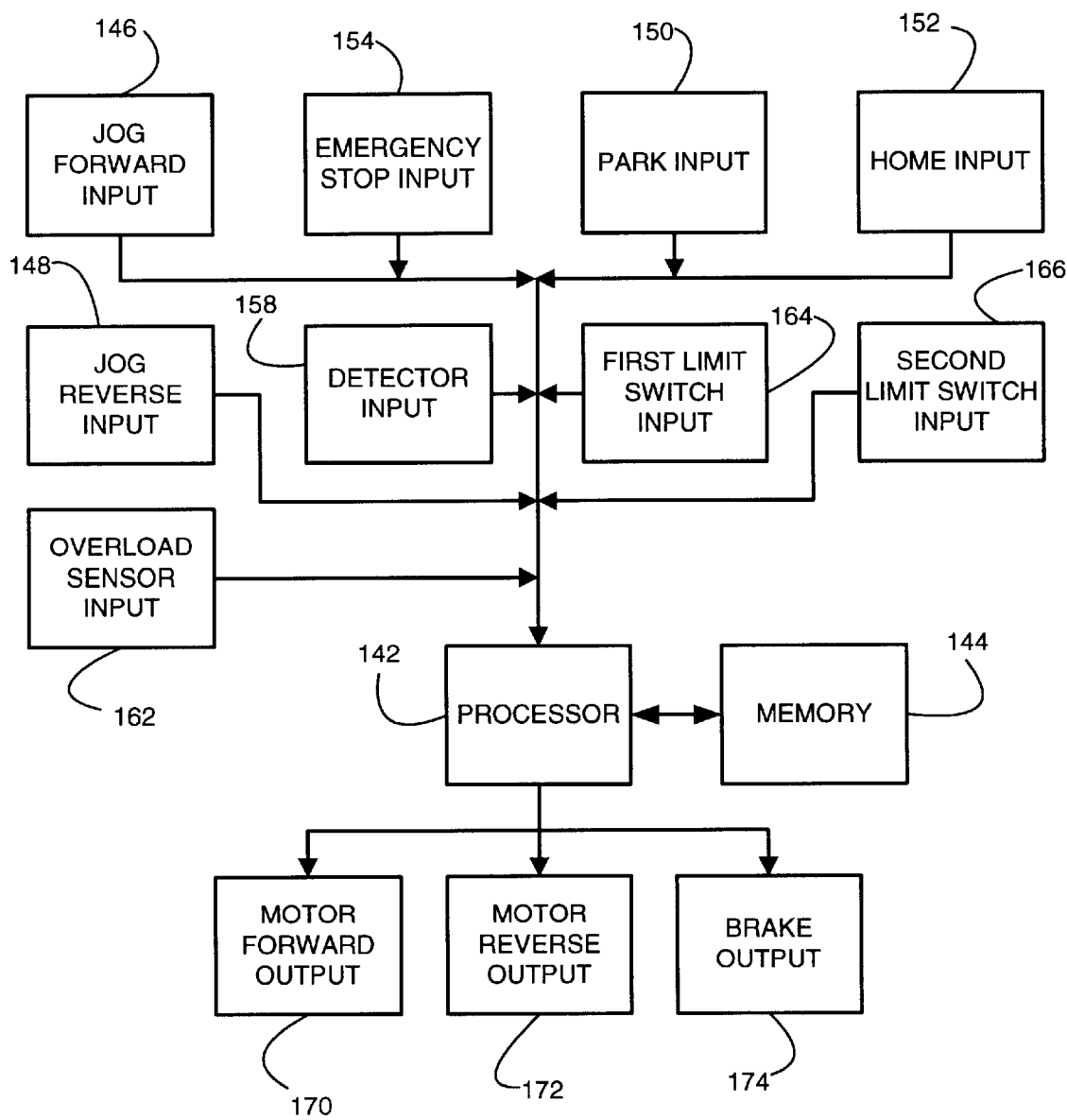
FIG. 12 is a diagrammatic representation of the present invention.

A controller assembly 140 may be provided for controlling positioning movement of the shuttle with respect to the frame and other operations of the invention (see FIG. 12). The controller assembly may comprise a processor 142 for receiving signals from control inputs and sending signals to control outputs. A memory means 144 may also be provided for storing information, and is operatively connected to the processor for providing the stored information to the processor as needed. The memory means may include a look-up table containing information regarding the width dimensions of various types of materials.

The controller assembly 140 may also include at least one, and preferably a plurality of, control inputs, which are operatively coupled to and in communication with the processor for providing the processor with various operational information from the system. The control inputs may each take the form of a switch, such as a pushbutton, mounted on a control panel for actuation by the operator of the system. The control inputs may include a jog forward input 146 for causing movement of the shuttle on the frame toward the first one 34 of the first sides of the frame. Actuation of the jog forward input (e.g., pushing of the associated pushbutton) may cause the processor to actuate or operate the second motor in a first rotational direction so that the subframe and the shuttle are moved toward the first one of the first sides. The control inputs may also include a jog reverse input 148 for causing movement of the shuttle on the frame toward the second one 35 of the first sides of the frame. Actuation of the jog reverse input causes the processor to actuate or operate the second motor in a second rotational direction so that the subframe and the shuttle are moved toward the second one of the first sides.

The control inputs may also include a park input for causing movement of the shuttle to a park position on the frame at which the cart may be loaded onto and removed from the shuttle. The park position may be located adjacent to one of the second sides of the frame, adjacent to a ramp or other means for raising the cart up to the level of the top 62 of the bed of the shuttle. The control inputs may further include a home input 152 for causing movement of the shuttle to a home position on the frame. The home position may be located at one of the corners of the frame where the shuttle may be placed during periods of non-use of the system. The control inputs may also include an emergency stop input 154 for causing an immediate stop of the first and second moving assemblies when that is desired, such as, for example, when the operator observes a malfunction of the system or some other occurrence makes further operation unsafe.

The controller assembly may also includes a plurality of sensor inputs which detect various conditions of the system, and which are operatively coupled to and in communication with the processor for providing the processor with various operational information from the system. The sensor inputs are not necessarily dependent upon operator actuation. The sensor inputs may include a detector 158 for detecting movement of material on one of the material support arm assemblies. The detector preferably comprises a sensor mounted on one of the support arm assemblies at a distance from the second end of the support arm. In one preferred embodiment of the invention, the detector comprises an optical sensor 160 positioned such that pieces of material moving along the support arm on the chain passes over the optical sensor. The detector passes a detection signal for as long as the material is detected passing by the detector, and thus the duration of the signal generally corresponds to the width of the material passing by the detector. The determination of the width may be accomplished by comparing the duration of the signal to the known detection signal durations produced by materials of known widths passing by the detector. It will be understood that the speed of the chain movement on the support arm will affect the durations of the detection signal, so the speed of the chain should be kept substantially uniform during operation of the system.

The sensor inputs may also include an overload sensor 162 for detecting an overload of components of the system, such as, for example, the first and second motors, so that unusual conditions that might indicate a malfunction are detectable by the processor. The overload condition may comprise excessive current or voltage in the powering circuit of the motors. The sensor inputs may further include a first limit switch input 164 for detecting movement of the shuttle to a first outermost position on the frame, and a second limit switch input 166 for detecting movement of the shuttle to a second outermost position opposite the first outermost position. The limit switch inputs 164, 166 may be operatively connected to a first limit switch 165 and a second limit switch 167, respectively. These limit switches may detect when the second motor has moved the subframe and shuttle to the limit in one or the other direction on the frame and no further movement is possible.

The controller assembly may also include at least one, and preferably a plurality of, control outputs, which are operatively coupled to and in communication with the processor for providing the processor with means for controlling operation of various operational components of the system. The control outputs may include a motor forward output 170 for causing the second motor to operate in a manner moving the shuttle toward the first one of the first sides of the frame, and a motor reverse output 172 for causing the second motor to operate in a manner moving the shuttle toward the second one of the first sides of the frame. The motor is preferably adapted to rotate for a number of steps signaled by the processor through the motor forward and reverse outputs. The control outputs may also include a brake output 174 for causing stopping movement of the shuttle by the second motor. The brake output may control a brake (and/or optionally a clutch) that is operatively coupled to the second motor.

Figure 9:
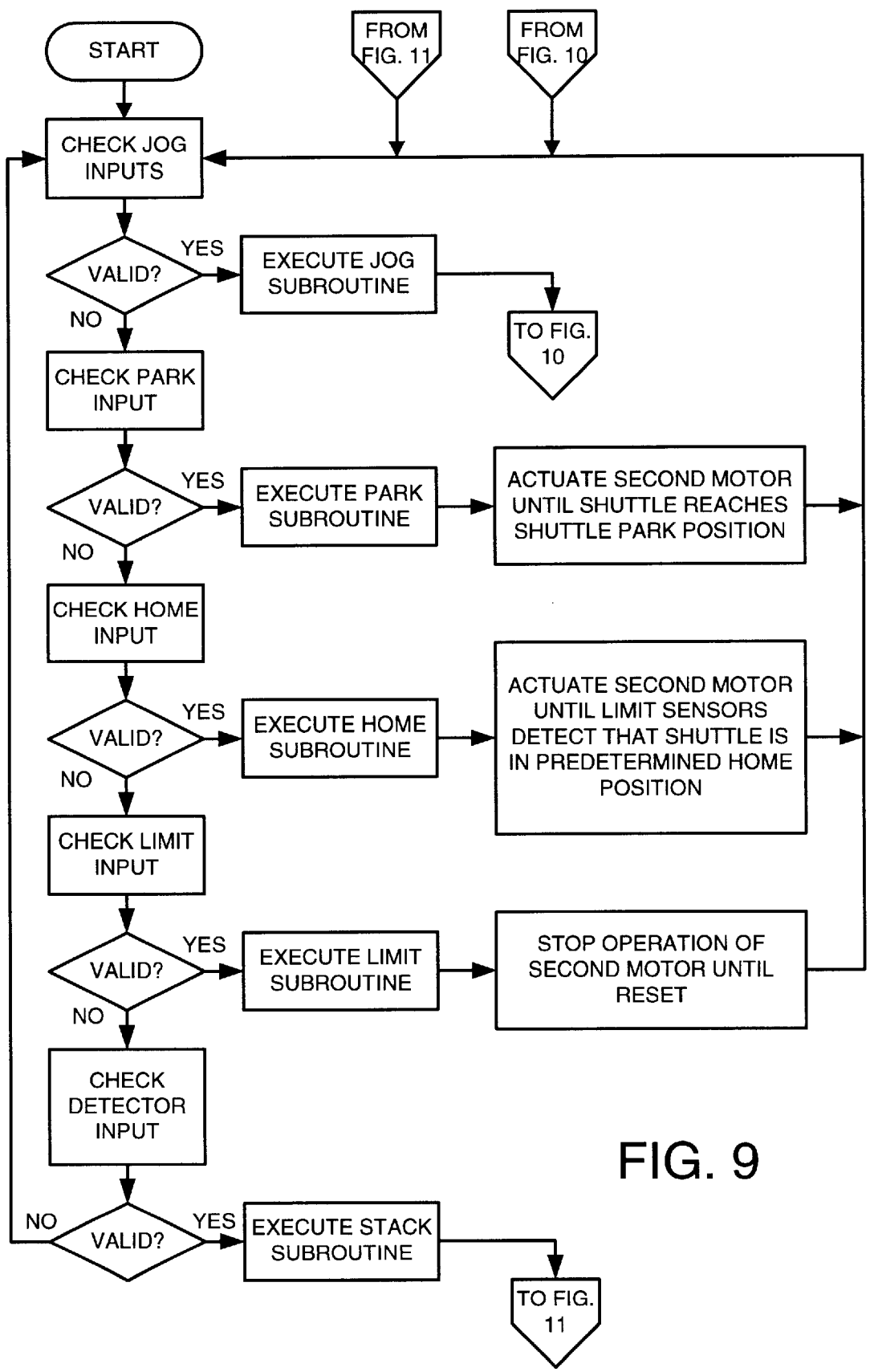
FIG. 9 is a schematic operational flow diagram of the present invention.
Figure 10:
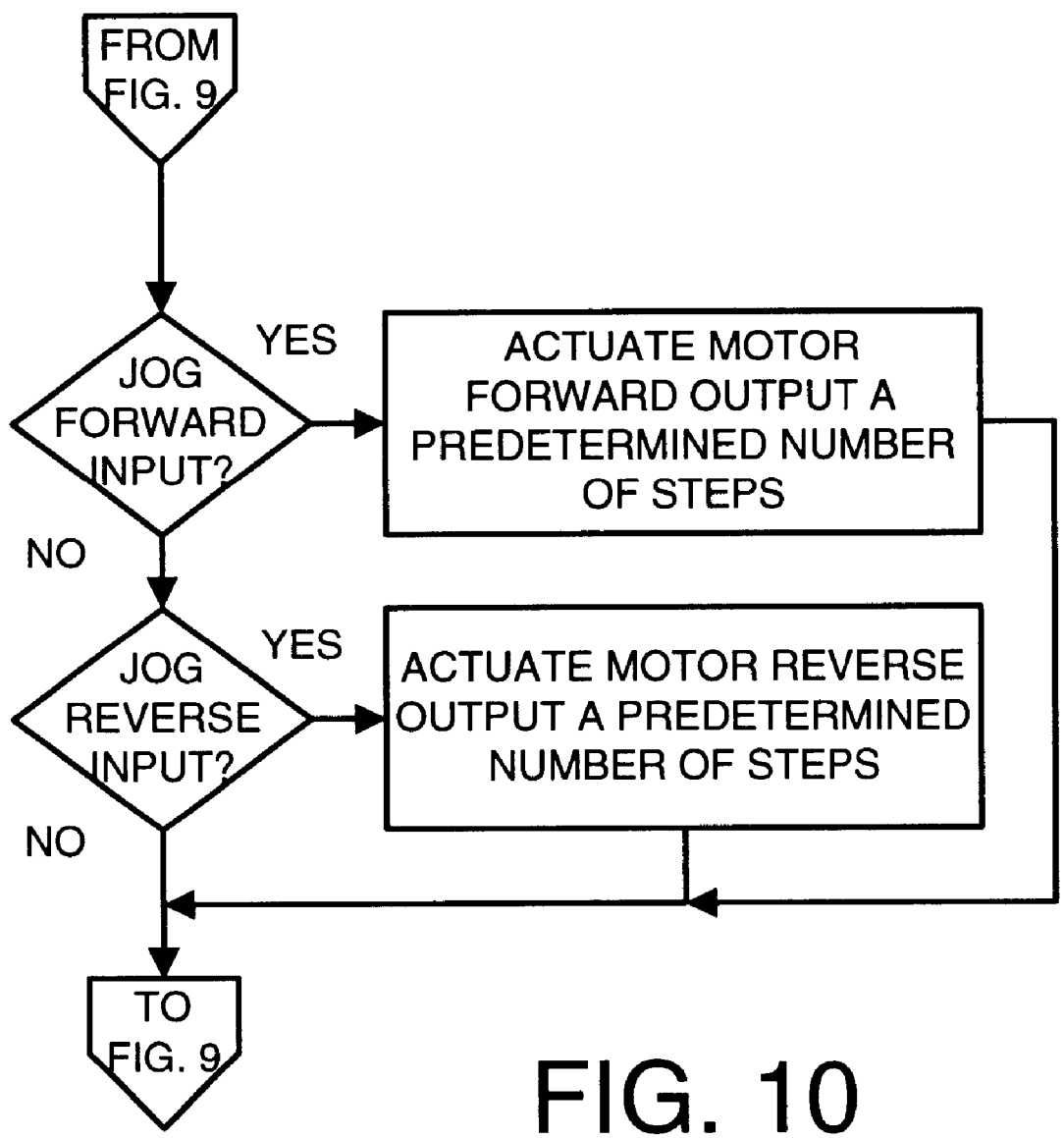
FIG. 10 is a schematic operational flow diagram of the jog subroutine of the present invention.
Figure 11:
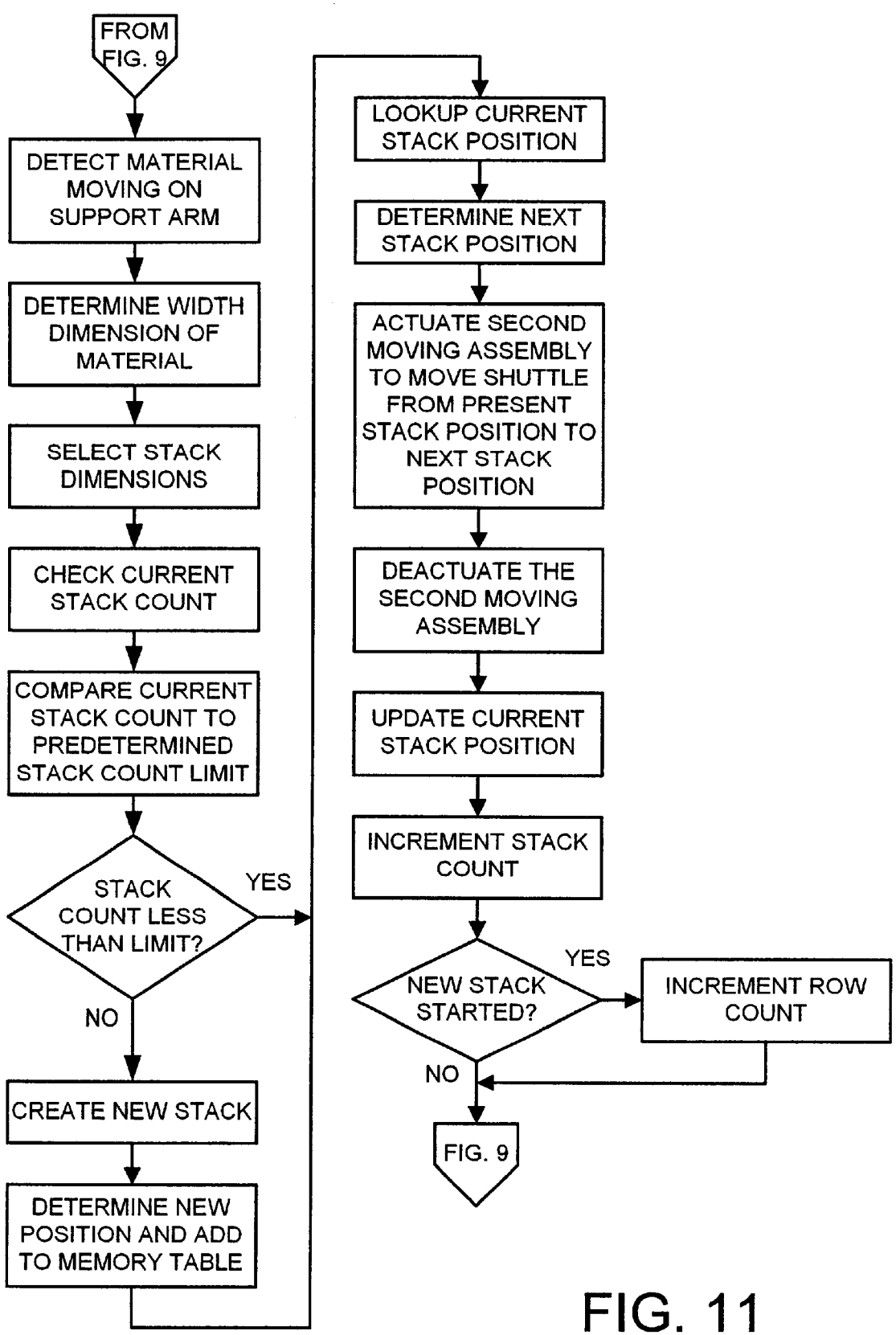
FIG. 11 is a schematic operational flow diagram of the stack subroutine view of the present invention.

In one illustration of operation of the system, as shown in FIGS. 9 through 11, the processor 142 of the controller assembly 140 monitors the various control inputs (see FIG. 9) for actuation or activation of one of the control inputs. When one of the control inputs is activated and becomes valid, the processor executes one of a number of subroutines corresponding to the particular control input that is activated. When one of the jog inputs is activated, a jog subroutine is executed (see FIG. 10), and the processor actuates the second motor in a forward or reverse direction by signaling the motor through forward or motor reverse outputs depending upon whether the forward or reverse jog input has been activated by the user. The operation of the processor returns to monitoring the inputs (FIG. 9), and the operator may further activate the jog forward or reverse inputs in order to cause further movement of the shuttle between the first and second one of the first sides.

Upon activation of the park input, the processor executes a park subroutine (see FIG. 9) and actuates one or more of the moving assemblies to move the shuttle to a predetermined park position on the frame. Preferably the park position is at a location where a cart may be easily loaded onto and unloaded from the shuttle prior to and after loading of materials on the cart. Upon activation of the home input, the processor executes a home subroutine (see FIG. 9) and actuates one or more of the moving assemblies to move the shuttle to a predetermined home position, which is preferably suitable for the shuttle during periods of non-use of the system.

The sensor inputs may also trigger the processor to execute subroutines of operation. Upon movement of the subframe against one of the limits sensors 165, 167 and the limit sensor input 164, 166 is activated, the processor 142 executes a limit subroutine in which the operation of one or more of the moving assemblies is terminated until the system is reset by the operator.

When the detector input 158 is activated, such as by the movement of a piece of material past the optical sensor on the support arm, the processor executes a stack subroutine. In the stack subroutine (see FIG. 11), the width of the piece of material is determined. This may be accomplished in a number of ways, but one of the most preferred methods is for the processor to measure the period of the time that the material is detected by the optical sensor, and to calculate the width of the material based on a known rate of travel of the material past the optical sensor on the material support arm. The processor then selects, or retrieves from memory, the predetermined maximum dimension of the stack.

A predetermined overall dimension of the pile, or load, of material to be held in the cart is saved in memory, and generally comprises a maximum stack dimension and a maximum row dimension. The maximum stack dimension measures the maximum width of the load of material along the width dimension of the materials, and the maximum row dimension measures the maximum height of the load of material along the thickness dimension of the materials. Typically, the maximum stack dimension will be measured in a direction substantially perpendicular to a direction of the maximum row dimension.

After the stack dimensions have been retrieved from memory, a current stack count, or position, is retrieved from memory. The current stack count is the summation of the individual stack dimensions, or widths, of the materials already placed in the current row of the load. The current stack count is compared to the maximum stack dimension, or stack count limit, to determine if further materials may be placed in the current row, or if the material is to be placed in a new row. If the current stack count is equal to or greater than the stack count limit, a new stack is created in a new row of the load. The processor then determines the new position, or current stack count, in the new row. If the stack count is less than the stack count limit, and when a new row has been created, the current stack count, or position, is retrieved and the next stack position is determined based on the detected width of the material to be added to the load. The second moving assembly, and particularly the second motor, is then actuated to move the shuttle from the current stack position to the next stack position so that the piece of material coming off of the material support arms will drop into the proper position on the load on the cart. Once the processor detects that the second moving assembly has moved the shuttle to the appropriate position, the second moving assembly is deactuated. The current stack position, or count, is then updated in memory by incrementing the stack count. If the material was placed in a new stack in a new row, the row count is incremented in memory. The processor then waits for the next piece of material to be detected by the detector input (see FIG. 9).

Significantly, the sloping support surfaces of the cart permit material to be dropped onto one of the surfaces, or onto material lying on one of the surfaces, and the force of gravity may assist the movement of the material into place on the load. This self-centering effect on the materials dropped onto the cart tends to move the material into an abutting relationship with the previous piece of material placed in the stack of the current row. This effect is not possible when a support surface is horizontally oriented.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cart loading system for loading materials on a cart from a material shaping table for shaping pieces of material, the cart loading system comprising:

a frame for positioning on a floor surface adjacent to a material shaping table, the frame having a perimeter;

at least one material support arm assembly for moving a piece of material from the material shaping table to a position over the frame, the at least one material support arm assembly having a first end for mounting on the material shaping table and a second end for positioning above the frame;

a carriage assembly adapted for moving the material cart in a first direction and a second direction with respect to the frame, the carriage assembly being movably mounted on the frame, the carriage assembly comprising:

a subframe mounted on the frame in a manner permitting movement of the subframe in the second direction with respect to the frame;

a shuttle mounted on the subframe in a manner permitting movement of the shuttle in the first direction with respect to the subframe;

a first moving assembly for moving the shuttle in the first direction on the subframe;

a second moving assembly for moving the carriage assembly in the second direction with respect to the frame;

detection means for detecting movement of material on the at least one material support arm assembly, the detection means generating a detection signal when material moves toward the second end of the at least one material support arm assembly; and control means for controlling movement of the shuttle with respect to the frame, the control means being operatively connected to the detection means for receiving the detection signal from the detection means, the control means being adapted to move the shuttle a predetermined distance in the second direction based upon dimensions of the material determined from the detection signal.

2. The system of claim 1 additionally comprising a cart for transporting materials, the cart including a support frame having a first side portion and a second side portion, the first side portion having a first support surface and the second side portion having a second support surface, the first and second support surfaces forming a substantially V-shaped channel.

3. The system of claim 1 wherein the frame has a pair of first sides and a pair of second sides, the pair of first sides generally extending in the first direction and the second sides generally extending in the second direction, the first direction being oriented substantially perpendicular to the second direction, a first one of the first sides being positionable toward the material shaping table.

4. The system of claim 3 wherein the subframe has a first end and a second end, the first and second ends of the subframe each being movably mounted on one of the second sides of the frame.

5. The system of claim 1 wherein the at least one material support arm assembly includes a bar member having a perimeter and an elongate flexible member extending along and movable generally along the perimeter of the bar member.

6. The system of claim 1 wherein a pair of material support arm assemblies are included for mounting on the material shaping table in a substantially spaced, parallel relationship.

7. The system of claim 1 wherein the shuttle comprises:
a bed having a top for supporting the material cart and a bottom; and
a plurality of rollers each being mounted on the bottom of the bed and resting on the subframe for facilitating movement of the shuttle on the subframe.

8. The system of claim 1 wherein the first moving assembly comprises:
a first motor mounted on the subframe, a drive sprocket being mounted on the first motor;
a driven sprocket rotatably mounted on the shuttle; and
a chain extending about the drive and driven sprocket, a portion of the chain being fixed on the shuttle such that rotation of the drive sprocket by the first motor in a first rotational direction moves the shuttle toward a first one of the ends of the subframe and rotation of the drive sprocket by the first motor in a second rotational direction moves the shuttle toward a second one of the ends of the subframe.

9. The system of claim 1 wherein the first moving assembly comprises:
a first motor mounted for movement with the shuttle, a drive sprocket being mounted on the first motor; and
a chain being mounted on an upper surface of the subframe, the chain extending longitudinally between the ends of the subframe, the drive sprocket having a plurality of teeth engaging a portion of the chain such that rotation of the drive sprocket by the first motor in a first rotational direction moves the shuttle toward a first one of the ends of the subframe and rotation of the drive sprocket by the first motor in a second rotational direction moves the shuttle toward a second one of the ends of the subframe.

10. The system of claim 1 wherein the detection means comprises an optical sensor.

11. The system of claim 10 wherein the optical sensor is mounted on the at least one material support arm assembly at a position spaced from the second end of the at least one material support arm assembly.

12. The system of claim 1 wherein the control means comprises a processor in communication with the detection means and a second motor of the second moving assembly.

13. A cart loading system for loading materials on a cart from a material shaping table for shaping pieces of material, the cart loading system comprising:
a cart for transporting materials, the cart having a base frame, a plurality of wheels mounted on the bottom of the base frame, each of the wheels being mounted adjacent to a corner of the base frame, each of the wheels being oriented for rotation about substantially parallel axes, a support frame being mounted on a top of the base frame, the support frame having a first side portion and a second side portion, the first side portion having a first support surface and the second side portion having a second support surface, the first and second support surfaces lying in planes oriented substantially perpendicular to each other to form a substantially V-shaped channel, the planes of the first and second support surfaces each being oriented at an angle of approximately 45 degrees with respect to a horizontal plane;
a frame for positioning on a floor surface adjacent to a material shaping table, the frame having a perimeter, the frame having a pair of first sides and a pair of second sides, the pair of first sides generally extending in a first direction and the second sides generally extending in a second direction, the first direction being oriented substantially perpendicular to the second direction, a first one of the first sides being positionable toward the material shaping table;
at least one material support arm assembly for moving a piece of material from the material shaping table to a position over the frame, at least a portion of the material support arm assembly extending over the frame, the at least one material support arm assembly extending over the first one of the first sides, the at least one material support arm assembly having a first end for mounting on the at least one material shaping table and a second end for positioning above the frame;
wherein the at least one material support arm assembly includes a bar member having a perimeter and an elongate flexible member extending along and movable generally along the perimeter of the bar member, the elongate flexible member comprising a chain being entrained on the perimeter of the bar member, the chain having a plurality of teeth mounted thereon, the teeth being positioned on the chain at substantially uniform spacings;
wherein a pair of material support arm assemblies are included, the material support arm assemblies being oriented substantially parallel with respect to each other, the material support arm assemblies being laterally spaced from each other, the teeth on the chains of the material support arm assemblies being adapted to move along the bar members with a connecting axis oriented substantially perpendicular to the bar members;
a carriage assembly adapted for moving the material cart in the first direction and the second direction with respect to the frame, the carriage assembly being movably mounted on the frame, the carriage assembly comprising:
a subframe mounted on the frame in a manner permitting movement of the subframe in the second direction with respect to the frame, the subframe having a first end and a second end, the first and second ends of the subframe each being movably mounted on one of the second sides of the frame;
a shuttle mounted on the subframe in a manner permitting movement of the shuttle in the first direction with respect to the subframe, the shuttle comprising:
a bed having a top for supporting the material cart, the shuttle having a bottom, a pair of tracks on the top of the bed for receiving wheels of the material cart, a stop being mounted on at least one of the tracks for blocking movement of the material cart off of the bed in one direction; and
a plurality of rollers each being mounted on the bottom of the bed for facilitating movement of the shuttle on the subframe, each of the rollers comprising a substantially spherical ball mounted in a socket, the socket of each of the rollers being mounted on the bottom of the bed;
a first moving assembly for moving the shuttle in the first direction on the subframe, the first moving assembly being manually actuatable; wherein the first moving assembly comprises:
a first motor mounted on the subframe, the first motor being mounted adjacent one of the ends of the subframe, a drive sprocket being mounted on the first motor;
a driven sprocket rotatably mounted on the shuttle;
a chain extending about the drive and driven sprocket, a portion of the chain being fixed on the shuttle such that rotation of the drive sprocket by the first motor in a first rotational direction moves the shuttle toward a first one of the ends of the subframe and rotation of the drive sprocket by the first motor in a second rotational direction moves the shuttle toward a second one of the ends of the subframe;

a second moving assembly for moving the carriage assembly in the second direction with respect to the frame, the second moving assembly comprising:

an elongate flexible member extending along one of the second sides of the frame, the elongate flexible member having a portion thereof mounted on the subframe such that movement of the elongate flexible member moves the subframe in the second direction with respect to the frame, the elongate flexible member comprising a chain loop mounted on spaced sprockets, each of the spaced sprockets being located adjacent to one of the first sides of the frame;

wherein a pair of the chain loops are provided with each of the chain loops being positioned adjacent to one of the second sides of the frame such that the chain loops are oriented in a spaced, substantially parallel relationship, each of the chain loops being mounted on the spaced sprockets adjacent to one of the ends of the subframe;

a second motor being mounted on the frame, the second motor being positioned adjacent to the first one of the first sides of the frame, the second motor having a rotational axis oriented substantially parallel to the first sides;

transferring means for transferring rotational motion from the second motor to the chain loops, the transferring means comprising:

a driver pulley being mounted on the second motor and being rotated by the second motor;

a transfer assembly including:
a driven pulley;
a loop member rotationally connecting the driver pulley and the driven pulley;
a transfer gear case having an input member mounted for rotation with the driven pulley, a pair of opposite output members, and a plurality of gears connecting the input member to the output members;

a pair of transfer shafts being rotationally mounted on the frame, each of the transfer shafts being connected to one of the output members of the transfer assembly, the transfer shafts being positioned adjacent to the first one of the first sides, the transfer shafts extending substantially parallel to the first sides of the frame, the transfer shafts having a pair of opposite ends, each of the opposite ends being positioned substantially adjacent to one of the second sides of the frame;

wherein one of the spaced sprockets is mounted on each of the transfer shafts, detection means for detecting movement of material on the at least one material support arm assembly, the detection means generating a detection signal when material moves toward the second end of the at least one material support arm assembly; and control means for controlling movement of the shuttle with respect to the frame, the control means being operatively connected to the detection means for receiving the detection signal from the detection means, the control means being adapted to move the shuttle a predetermined distance in the second direction based upon dimensions of the material determined from the detection signal.

* * * * *